United States Patent

[11] 3,624,281

[72] Inventor John T. Phan
Redwood City, Calif.

[21] Appl. No. 857,435
[22] Filed Sept. 12, 1969
[45] Patented Nov. 30, 1971
[73] Assignee Data Memory, Inc.
Mountain View, Calif.

[54] VIDEO RECORDER PLAYBACK SYSTEM FOR PROVIDING PHASED COLOR TELEVISION SIGNALS
8 Claims, 2 Drawing Figs.

[52] U.S. Cl. .......... 178/5.4 CD, 178/6.6 A, 178/69.5 CB, 178/69.5 G
[51] Int. Cl. .......... H04n 5/78, H04n 9/46
[50] Field of Search .......... 178/6.6 A, 5.4 CD, 69.5 G, 69.5 CB

[56] References Cited

UNITED STATES PATENTS

| | | | |
|---|---|---|---|
| 2,979,562 | 4/1961 | Leyton | 178/6.6 A |
| 3,059,052 | 10/1962 | Smith | 178/69.5 G |
| 3,504,111 | 3/1970 | Sumida | 178/5.4 CD |

*Primary Examiner*—Bernard Konick
*Assistant Examiner*—Howard W. Britton
*Attorney*—Lowhurst & Hamrick

ABSTRACT: A video recorder playback system for producing a phased color television signal, comprising: a demodulator and a chroma filter responsive to the recorded signal and operative to respectively separate therefrom chrominance signals and a luminance signal having synchronization pulses; a sync stripper for stripping the synchronization pulses from the luminance signal to provide a stripped luminance signal; a signal generator for developing a subcarrier signal and synchronization pulses from a single source; a modulator responsive to the chrominance signals and subcarrier signals and operative to develop modulated chrominance signals; and a signal adder responsive to the modulated chrominance signals, the stripped luminance signal, and the new synchronization pulses, and operative to develop the phase color television signal.

INVENTOR.
JOHN T. PHAN

BY [signature]
ATTORNEY

VIDEO RECORDER PLAYBACK SYSTEM FOR PROVIDING PHASED COLOR TELEVISION SIGNALS

BACKGROUND OF THE INVENTION

The present invention relates generally to video recording and playback apparatus and, more particularly, to a novel video playback system for generating broadcastable phased color signals without requiring the use of electronic time base correction apparatus.

In all magnetic recorders the signals exhibit errors due to small variations in the performance of the recording heads, variations in the speed of the magnetic storage medium, mechanical inaccuracies of rotating components in the playback and recording apparatus, and geometric instability of the magnetic medium due to variations in environmental conditions. In the reproduction of color video signals these errors become quite critical, since the color information is referenced to a subcarrier of approximately 3.58 megaHertz whose amplitude, frequency and phase must be accurately reproduced in order to allow a faithful reproduction of the recorded color signal to be made. Accordingly, the recorded color signal must be processed to reconstitute the reference carrier with the necessary accuracy.

Heretofore, in order to correct for the recorder instability so as to render the signal acceptable for standard television broadcast usage, electronic time base correction apparatus has been utilized to correct the recorder output down to a residual instability of approximately 5 nanoseconds. Once the signal has been so corrected, it is said to be suitable for broadcast. The problem, however, with the electronic time base correction method is that the apparatus required to perform the signal correction is very expensive and complicated to operate, and is thus unsuitable for many applications.

Because of the disadvantages associated with the use of the electronic time base correction devices, other approaches have been tried which typically utilize a crystal-controlled oscillator that locks onto the incoming recorded signal to allow remodulation of the demodulated color signal. However, there is no fixed time relationship between the subcarrier produced by the crystal oscillator and the sync signal, which is part of the signal taken from the recorder, since they are derived from separate sources. Therefore, the output produced is a nonphased color signal. Although such systems are capable, by precisely controlling the recorder drive speed, of producing a relatively stable color signal having a time base instability within the visually acceptable range of from 50 to 200 nanoseconds, these systems have been strictly limited to closed circuit operation because of their nonphased color characteristic.

OBJECTS OF THE INVENTION

It is therefore a primary object of the present invention to provide a novel method and apparatus for obtaining acceptable phased color signals from video recording apparatus without requiring the use of electronic time base correction devices.

Another object of the present invention is to provide a simplified method and apparatus for obtaining phased color signals from the output of a video recorder that is substantially less expensive than other methods used to achieve similar results.

Still another object of the present invention is to provide a novel method and apparatus for obtaining phased color signals from video recordings wherein the sync pulses are stripped from the recorded signal and an external signal-generating source is used to provide a new sync signal and subcarrier that are respectively reinserted and used to remodulate the demodulated color signal.

SUMMARY OF THE PRESENT INVENTION

In accordance with the present invention, an external generating source is used to provide a 3.58 megaHertz subcarrier and a synchronization signal, and means are provided for separating the R—Y, B—Y and luminance signals and then stripping the original sync from the luminance signal and the new subcarrier is used to remodulate the R—Y and B—Y signals. The new sync signal is reinserted into the luminance signal and these signals are then appropriately added together to reconstruct the complex video signal. Thus, since the sync signal and the subcarrier are derived from a single source, the resultant video signal is by definition a phased color signal. A highly stable recorder drive servo is used to maintain the time base within a maximum residual instability of approximately plus or minus 50 nanoseconds, resulting in a jitter of the video signal so small as to be undetectable by the human eye under normal viewing conditions.

Among the advantages of the present invention is that a relatively low cost, phased color reproduction means is provided for use in color broadcast television applications. A particular field of application is in stop-action, slow-motion and reverse-motion television recorder playback systems wherein pictures of broadcast quality can be obtained using the present invention.

IN THE DRAWING

DETAILED DESCRIPTION

Figure 1:
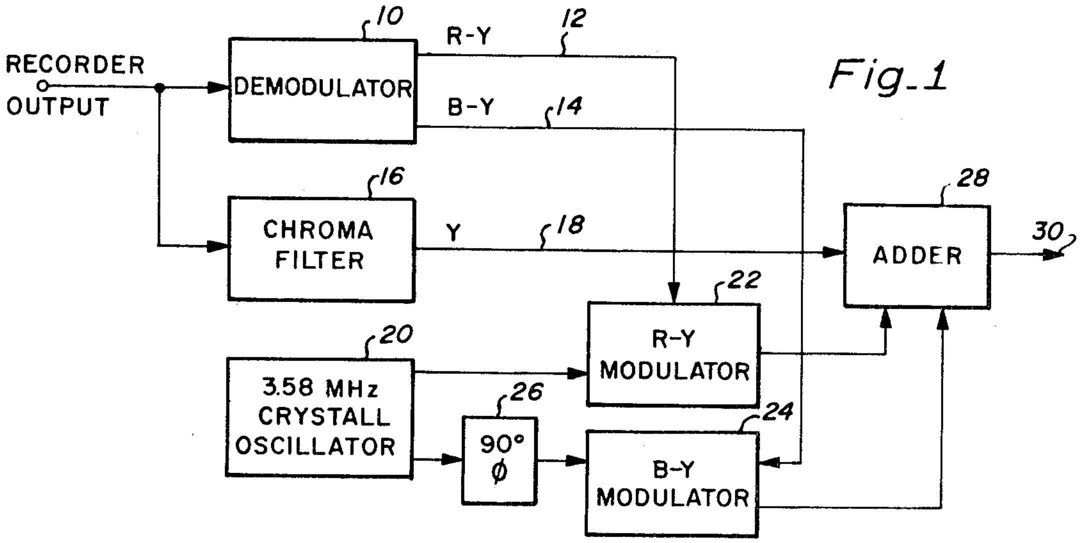
Fig 1 PRIOR ART
FIG. 1 is a block diagram of a nonphased color video playback system in accordance with prior art.

Referring now to FIG. 1 of the drawing, there is shown a prior art video playback circuit which is capable of producing a relatively stable color signal. However, because this system utilizes a separate signal source for producing the subcarrier used to decode the R—Y and B—Y signals, this system is incapable of producing a phased color output and is thus not suitable for color broadcast applications although it may be suitable for certain closed circuit usages.

In accordance with this prior art system, a video signal is obtained from the playback head of a video recorder having means for maintaining the playback speed as stable as possible so as to eliminate excessive picture jitter due to the time base instability caused by the recorder characteristics. The state of the art is now such that recorder playback instability can be reduced to within the visual tolerance range.

The video output of the recorder is fed through a demodulator 10 which demodulates the signal to produce a red minus luminance (R—Y) signal and a blue minus luminance (B—Y) signal on the lines 12 and 14 respectively. The recorder output signal is also fed into a chroma filter 16 which filters out all but the black and white, or luminance (Y) signals. It will be noted that this luminance signal also carries the original synchronization pulses (sync pulses). A 3.58 megaHertz crystal oscillator 20 is then used to drive an R—Y modulator 22 and a B—Y modulator 24 (via a 90° shifting means 26) which remodulates the R—Y and B—Y signals respectively, before they are fed into the adder matrix 28 to be combined with the luminance signal to produce the reconstituted video output signals at terminal 30.

Although the output jitter of the system can be controlled by accurately controlling the speed of the magnetic storage medium relative to the pickup heads, the system necessarily produces a nonphased color signal since the sync and the subcarrier are obtained from different sources. That is, the sync signal is that of the original recorded video signal, as reproduced, and the subcarrier is obtained from the crystal oscillator 20.

Figure 2:
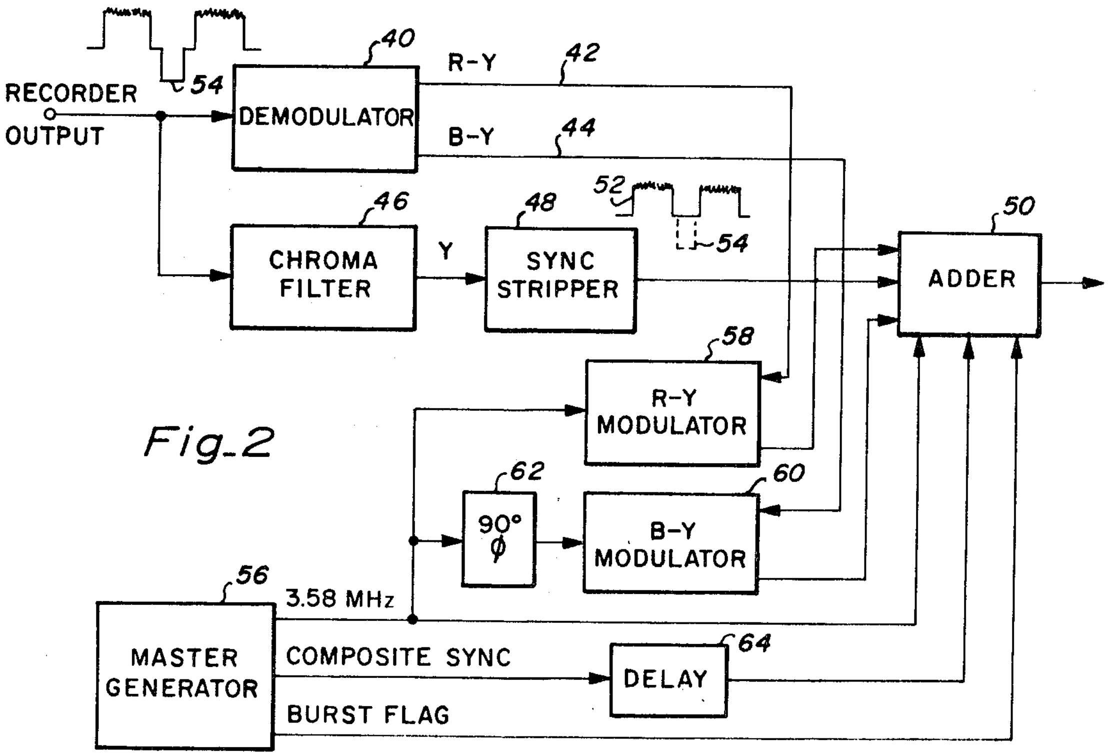
FIG. 2 is a block diagram of a phased color video playback system in accordance with the present invention.

Turning now to FIG. 2 of the drawing, a phased color system in accordance with the present invention is schematically illustrated. In this simplified embodiment as in the similar prior art device described above, the video recorder output signal is fed directly into a demodulator 40 which produces the red minus luminance (R—Y) and blue minus luminance (B—Y) chrominance signals on the lines 42 and 44 respectively, and the recorder output signal is also fed into a chroma filter 46 which produces the luminance signal (Y). However, in accordance with the present invention the luminance signal is then passed through a sync stripper 48 for stripping the sync pulses 54 from each frame before the signal is fed to the adder network 50. As an example, the stripper might take the form of a clipping amplifier. After the sync pulses have been so removed, the stripped luminance signal input to the adder 50 resembles that indicated at 52.

In order to insure that a phased color output is obtained, remembering that by definition, a phased color signal is one which has sync pulses and subcarrier derived from a single source, both the new 3.58 megaHertz subcarrier and the 15.75 kiloHertz sync pulses are obtained from the signal source of a single master generator 56. Normally, a broadcast station has on hand a suitable generator 56. In fact, any television camera includes a generator from which the necessary signals can be obtained.

The new subcarrier signal is used to drive the R—Y modulator 58 and the B—Y modulator 60 (via the 90° phase shifter 62) that remodulate the R—Y and B—Y signals which are then fed into the adder 50. The composite sync signal produced by the generator 56 is delayed by a suitable delay network 64 before being introduced into the adder 50 so as to be reinserted into the video signal at the proper point in time. The delay network 64 is typically comprised of a lumped constant delay line. The adder 50 in a preferred embodiment takes the form of gated amplifiers.

Furthermore, in order that the correct frequency and exact phase of the color subcarrier may be detected by a remote television receiver so as to enable decoding of the composite signal components, color burst of the subcarrier frequency and phase are also introduced into the adder 50 from the master generator 56. These color bursts are superimposed onto the "front porch" of the composite signal by the adder 50.

While the luminance and chrominance information are obtained from the recorded original signal, all of the control information which appears in the complex color signal is generated from a single source, i.e., the master generator 56. As a result, a completely phased color signal which is suitable for broadcast applications is produced at the system output, assuming of course, that the recorder supplying the input signal can be servoed with sufficient accuracy to produce a signal having a time base stability within the visually acceptable range mentioned above so that no objectionable picture jitter is apparent.

Whereas the present invention has been disclosed in simplified block diagram form, it is contemplated that many alterations and modifications thereof will become apparent to those skilled in the art after having read the foregoing disclosure. I, therefore, intend that the appended claims be interpreted as covering all such alterations and modifications which fall within the true spirit and scope of the invention.

What is claimed is:

1. A video recorder playback system for providing a phased color television signal, comprising:
   means responsive to a recorded video signal and operative to separate therefrom chrominance signals and a luminance signal including synchronization pulses;
   means for stripping the synchronization pulses from said luminance signal to provide a stripped luminance signal;
   signal-generating means including a single signal source having an output from which a new subcarrier signal and new synchronization pulses are developed;
   modulator means responsive to said chrominance signals and said new subcarrier signal and operative to develop modulated chrominance signals; and
   signal-adding means responsive to said modulated chrominance signals, said stripped luminance signal, and said new synchronization pulses and operative to develop therefrom said phased color television signal.

2. A video recorder playback system as recited in claim 1 wherein said signal generating means also provides a color burst signal derived from the output of said single signal source, and said signal-adding means is also responsive to said color burst signal and operative to include said color burst signal in said phased color television signal.

3. A video recorder playback system as recited in claim 1 and further comprising delay means for delaying said new synchronization pulses for a predetermined period of time before they are coupled into said signal-adding means.

4. In a video recorder playback system including, means for demodulating a recorded color signal to provide chrominance signals, means for filtering the recorded color signal to provide a luminance signal including synchronization pulses, signal-generating means for developing a new subcarrier signal, means for modulating said new subcarrier signal with said chrominance signals to provide modulated chrominance signals, and signal-adding means for combining the modulated chrominance signals and the luminance signal, the improvement comprising:
   means for stripping the synchronization pulses from the luminance signal to provide a stripped luminance signal;
   said signal-generating means including a single signal source having an output from which said new subcarrier signal and new synchronization pulses are developed; and
   said adding means being operative to combine said new synchronization pulses, said stripped luminance signal, and said modulated chrominance signals to provide a phased color television signal.

5. In a video recorder playback system as recited in claim 4 wherein a color burst signal is also developed from the output of said single signal source, and said color burst signal is coupled into said signal-adding means for inclusion in said phased color television signal.

6. A method of producing a phased color television signal from the recorded signal developed by a video recorder, comprising:
   demodulating the recorded signal to provide chrominance signals;
   filtering the recorded signal to provide a luminance signal having synchronization pulses;
   stripping the synchronization pulses from said luminance signal to provide a stripped luminance signal;
   developing a new subcarrier signal and new synchronization pulses from the output of a single signal source;
   modulating said new subcarrier signal with said chrominance signals to provide modulated chrominance signals; and
   adding together said modulated chrominance signals, said stripped luminance signal, and said new synchronization pulses to form said phased color television signal.

7. A method of producing a phased color television signal as recited in claim 6 and further comprising the steps of developing a color burst signal from the output of said single signal source, and adding said color burst signal together with said modulated chrominance signals, said stripped luminance signal, and said new synchronization pulses to form said phased color television signal.

8. A method of producing a phased color television signal as recited in claim 6 wherein the time base stability of said recorded signal is better than ±50 nanoseconds.

* * * * *